US012100376B2

(12) United States Patent
Gill et al.

(10) Patent No.: US 12,100,376 B2
(45) Date of Patent: Sep. 24, 2024

(54) MUSICAL STEP SEQUENCER AND CONTROLLER

(71) Applicant: inMusic Brands, Inc., Cumberland, RI (US)

(72) Inventors: Daniel Gill, Providence, RI (US); John Alex Souppa, Ashland, MA (US); Torrie Justin Jones, Los Angeles, CA (US); John O'Donnell, Fort Lauderdale, FL (US)

(73) Assignee: inMusic Brands, Inc., Cumberland, RI (US)

(*) Notice: Subject to any disclaimer, the term of this patent is extended or adjusted under 35 U.S.C. 154(b) by 138 days.

(21) Appl. No.: 16/585,375

(22) Filed: Sep. 27, 2019

(65) Prior Publication Data

US 2020/0126525 A1 Apr. 23, 2020

Related U.S. Application Data

(60) Provisional application No. 62/737,701, filed on Sep. 27, 2018.

(51) Int. Cl.
*G10H 1/00* (2006.01)

(52) U.S. Cl.
CPC ......... *G10H 1/0066* (2013.01); *G10H 1/0008* (2013.01); *G10H 2220/026* (2013.01); *G10H 2220/101* (2013.01); *G10H 2220/155* (2013.01)

(58) Field of Classification Search
CPC ............... G10H 1/0066; G10H 1/0008; G10H 2220/026; G10H 2220/101; G10H 2220/155
See application file for complete search history.

(56) References Cited

U.S. PATENT DOCUMENTS

| | | | | |
|---|---|---|---|---|
| 6,151,620 | A * | 11/2000 | Madsen | H04L 12/1822 709/204 |
| 7,342,164 | B2 | 3/2008 | Nishibori et al. | |
| 7,394,010 | B2 | 7/2008 | Nishibori et al. | |
| 9,159,307 | B1 * | 10/2015 | Ludovici | G10H 1/055 |
| 10,269,335 | B1 * | 4/2019 | O'Hair | G10H 1/0008 |
| 10,380,982 | B1 | 8/2019 | Hovey | |
| 10,955,984 | B2 | 3/2021 | Decker et al. | |
| 2010/0064880 | A1 | 3/2010 | Takehisa et al. | |
| 2010/0064881 | A1 | 3/2010 | Takehisa | |
| 2013/0239787 | A1 | 9/2013 | McMillen et al. | |
| 2014/0053712 | A1 * | 2/2014 | Dreher | G10H 1/46 84/645 |
| 2014/0076126 | A1 * | 3/2014 | Terry | G10H 1/34 84/609 |
| 2016/0019875 | A1 | 1/2016 | Moriyama | |
| 2017/0109127 | A1 | 4/2017 | Osborn et al. | |
| 2018/0061383 | A1 | 3/2018 | Hovey | |

(Continued)

*Primary Examiner* — Jianchun Qin

(74) *Attorney, Agent, or Firm* — ARENTFOX SCHIFF LLP

(57) ABSTRACT

A step sequencer with a four by sixteen grid of buttons is disclosed. The sequencer is used to generate patterns of sounds on different channels. The sequencer can be used as a hardware controller to control music production software. The grid of the sequencer emulates the virtual grid generated in a graphical user interface by the music production software. The grid of the hardware controller is used to control the corresponding grid on the graphical user interface.

12 Claims, 4 Drawing Sheets

(56) References Cited

U.S. PATENT DOCUMENTS

| | | | | |
|---|---|---|---|---|
| 2019/0103085 | A1* | 4/2019 | Decker | G10H 1/40 |
| 2020/0005744 | A1* | 1/2020 | Godunov | G10H 1/0025 |
| 2020/0126525 | A1 | 4/2020 | Gill et al. | |
| 2020/0251079 | A1 | 8/2020 | Gill et al. | |

* cited by examiner

MUSICAL STEP SEQUENCER AND CONTROLLER

PRIORITY CLAIM

This application claim priority to U.S. Provisional Application No. 62/737,701, filed Sep. 27, 2018, which is incorporated by reference herein.

TECHNICAL FIELD

The present disclosure relates generally to a musical step sequencer. The present disclosure also relates to a hardware controller for music production software.

It is to be understood that the following detailed descriptions are exemplary and explanatory only, and are not restrictive of the claims.

BACKGROUND

Musical step sequencers ("sequencers") are used by musicians and composers to create musical sound patterns. Typically, a row of pads is used to program a sequence of sounds. These hardware devices may be connected to external sound systems (e.g., amplifiers, speakers, or headphones), which audibly reproduce the sound patterns transmitted from sequencers.

Sequencers typically include one or more rows of buttons. By pressing one or more buttons arranged in a row, a user can select the temporal location of a sound's playback within a pattern. For example, if the first button in the row of buttons is pressed, a sound associated with the row of buttons is played early in the pattern. Consequently, if the last button in the row of buttons is pressed, the sound is played late in the pattern. The pattern may be repeated until playback is stopped or until a predetermined number of repetitions is reached.

DESCRIPTION OF EXEMPLARY EMBODIMENTS

Reference will now be made to certain embodiments consistent with the present disclosure, examples of which are illustrated in the accompanying drawings. Wherever possible, the same reference numbers will be used throughout the drawings to refer to same or like parts.

Figure 1:
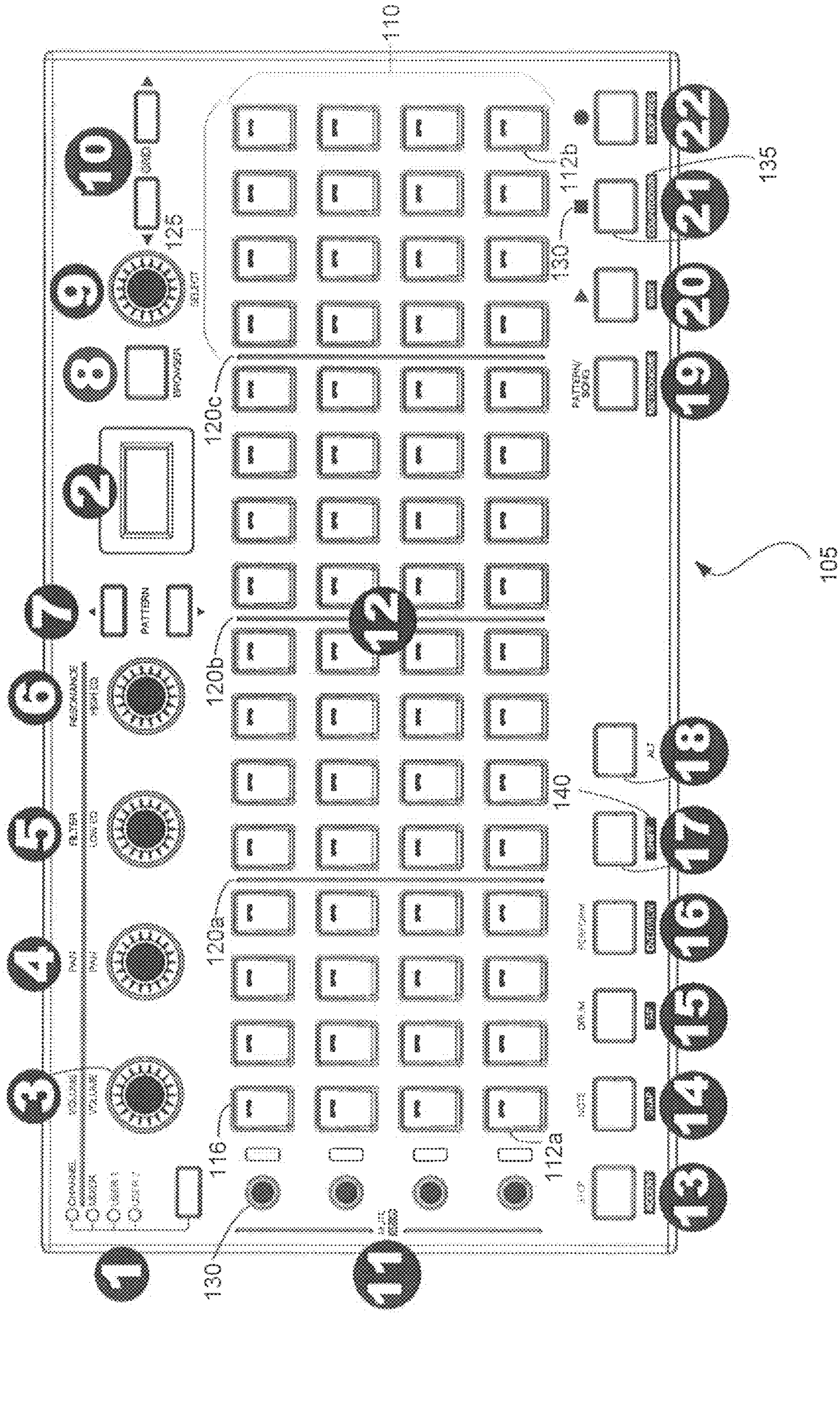
FIG. 1 is a plan view of the step sequencer according to one illustrative embodiment.

FIG. 1 shows an illustrative embodiment of a musical step sequencer 105 ("sequencer 105"). Sequencer 105 has 4×16 grid 110 of buttons. Each button is a soft touch RGB. Each row can correspond to an instrument sound such as kick, snare, or high hat. Grid buttons arranged in a single row may control the playback of one sound or a combination of sounds played simultaneously. For example, pressing grid button 112*a* causes sequencer 105 to play one or more sounds associated with the row containing grid button 112*a* early in the sub-pattern associated with this row when the sub-pattern playback is activated. Pressing grid button 112*b* causes sequencer 105 to play the same one or more sounds later in the sub-pattern when the sub-pattern playback is activated. As such, the column position of the button pressed controls the temporal location within the sub-pattern at which the sound associated with the button's row is heard.

A pattern comprises one or more sub-patterns. A sub-pattern is a selection of one or more temporal locations associated with a single sound. To play a pattern, the sequencer may simultaneously play one or more synchronized sub-patterns, thereby playing sub-patterns associated with respective sounds simultaneously. For example, a user may create a sub-pattern for a bass-drum sound using a row of buttons, select a different sound, and create a different sub-pattern for a snare-drum sound using the row of buttons. When a pattern containing these sub-patterns is played, the bass-drum sub-pattern and snare-drum sub-pattern may be played simultaneously and synchronized.

A user may create different sub-patterns that playback different sounds by pressing buttons located in different rows. The user may use knobs and buttons on sequencer 105 to associate a sound (e.g., a sample) with a particular row. The user may press button 116 to play a first sound associated with the row containing grid button 116 early in the sub-pattern when sub-pattern playback is activated. The user may press grid button 112*a* to play a second sound associated with the row containing grid button 112*a* when sub-pattern playback is activated. Because grid buttons 116 and 112*a* are located in the same column, the first and second sounds may be heard at the same time when pattern playback is activated. The user may press button 116 to play the first sound early in the sub-pattern and press grid button 112*b* to play the second sound later in the sub-pattern.

Because sequencer 105 has four rows of grid buttons within button grid 110, a user may control the temporal location at which four sounds are played within a pattern by pressing grid buttons in different rows. Because sequencer 105 has 16 columns of grid buttons in button grid 110, a user may select 16 locations within a sub-pattern at which a sound is played by pressing grid buttons in different columns but within a single row.

In some embodiments, the grid button shape and/or arrangement may differ from that shown in FIG. 1. For example, grid buttons may be square shaped or contain 90-degree corners instead or in addition to rounded corners. In some embodiments, there could be more or fewer columns of grid buttons and/or more or fewer rows of grid buttons, depending on the functional and visual preferences of a user. For example, there could be 16 columns and eight rows of grid buttons. In some embodiments, the rows could be curved, or the grid buttons could be arranged in clusters. Some variations in the appearance and arrangement of the grid buttons may be made without departing from the functionality and improvements disclosed herein.

In some embodiments, pattern and/or sub-pattern playback may be activated by pressing play button 20. Pattern playback may be activated before or after temporal locations for sound playback are chosen. In some embodiments, some temporal locations for sound playback may be chosen before pattern playback is activated and other temporal locations may be chosen after.

Sequencer 105 has dividers 120*a*, 120*b* and 120*c*. In some embodiments, sequencer 105 may have more or less dividers. Dividers may be indents in the body of sequencer 105 or raised portions in the body of sequencer 105. Dividers may serve as a visual and/or tactile indicator of the end and beginning of a section of button grid 110. For example, divider 120*c* may serve as a visual or tactile indicator of the beginning of section 125 of button grid 110. A divider may help a user quickly and accurately identify where a particular column is located. This may be especially useful in a live-performance situation, where poor lighting and other unfavorable conditions can make it difficult to quickly find a particular column.

Sequencer 105 may have shift button 17 and alt button 18. These buttons may increase the number of functions a user may perform using the other function buttons available on sequencer 105. For example, pressing stop/countdown button 21 without simultaneously holding down shift button 17 causes cessation of pattern playback. Pressing stop/countdown button 21, however, activates a countdown timer for a recording function on sequencer 105. Sequencer 105 may indicate a button's function when pressed without shift button 17 with an appropriate label above the button (e.g., stop sign 130 above stop/countdown button 21). Sequencer 105 may indicate a button's function when pressed with shift button 17 with an appropriate label below the button (e.g., countdown label 135 below stop/countdown button 21). The label indicating a button's function when pressed with shift button 17 may have a similar background to shift label 140.

In another example, a user may solo or mute a sub-pattern by pressing a mute/solo button, shown in button group 11, that is beside a row associated with the sub-pattern. For example, pressing mute/solo button 130 without shift button 17 will mute the sub-pattern associated with the row of grid buttons containing grid button 116. Pressing Shift button 17 and mute/solo button 130 simultaneously will solo the sub-pattern associated this row (i.e., will mute the other sub-patterns associated with other rows). Alt button 18 further expands the number of functions performed by a button. For example, pressing alt button 18 and mute/solo button 130 simultaneously will select the sub-pattern associated with the row of grid buttons that are beside mute/solo button 130 (i.e., the sub-pattern associated with the row containing grid button 116). In some embodiments, shift button 17 and alt button 18 may be pressed simultaneously to further increase the number of functions performed by a button. In some embodiments, it may be advantageous to place shift button 17 and alt button 18 close to each other so that they may be pressed simultaneously with one hand or one finger, leaving the other hand or other fingers available to select another button. In some embodiments, shift button 17 and/or alt button 18 may modify the function of a knob, such as volume knob 3. For example, rotating volume knob 3 without holding down alt button 18 may change the volume of audio outputted by sequencer 105, whereas rotating knob 3 while holding down alt button 18 may change the brightness of light emitting diodes (LEDs) illuminating features on sequencer 105 (e.g., grid buttons).

In some embodiments, the buttons of button grid 110 may be illuminated by LEDs to indicate when the buttons have been pressed and/or to indicate the temporal location at which a sound associated with the button will be played in a sub-pattern associated with the sound. In some embodiments, the LEDs may change colors and activate in a manner that visually indicates the frequency content of the sound being played by sequencer 105. For example, a column of grid buttons on the left side of sequencer 105 may be illuminated to indicate a substantial amount of low-frequency content and a column of grid buttons on the right side of sequencer 105 may be illuminated to indicate a substantial amount of high-frequency content. The spectral image thus created may mimic a spectral image shown in a software running a software-implemented sequencer (e.g., on a general-purpose computer).

Figure 2:
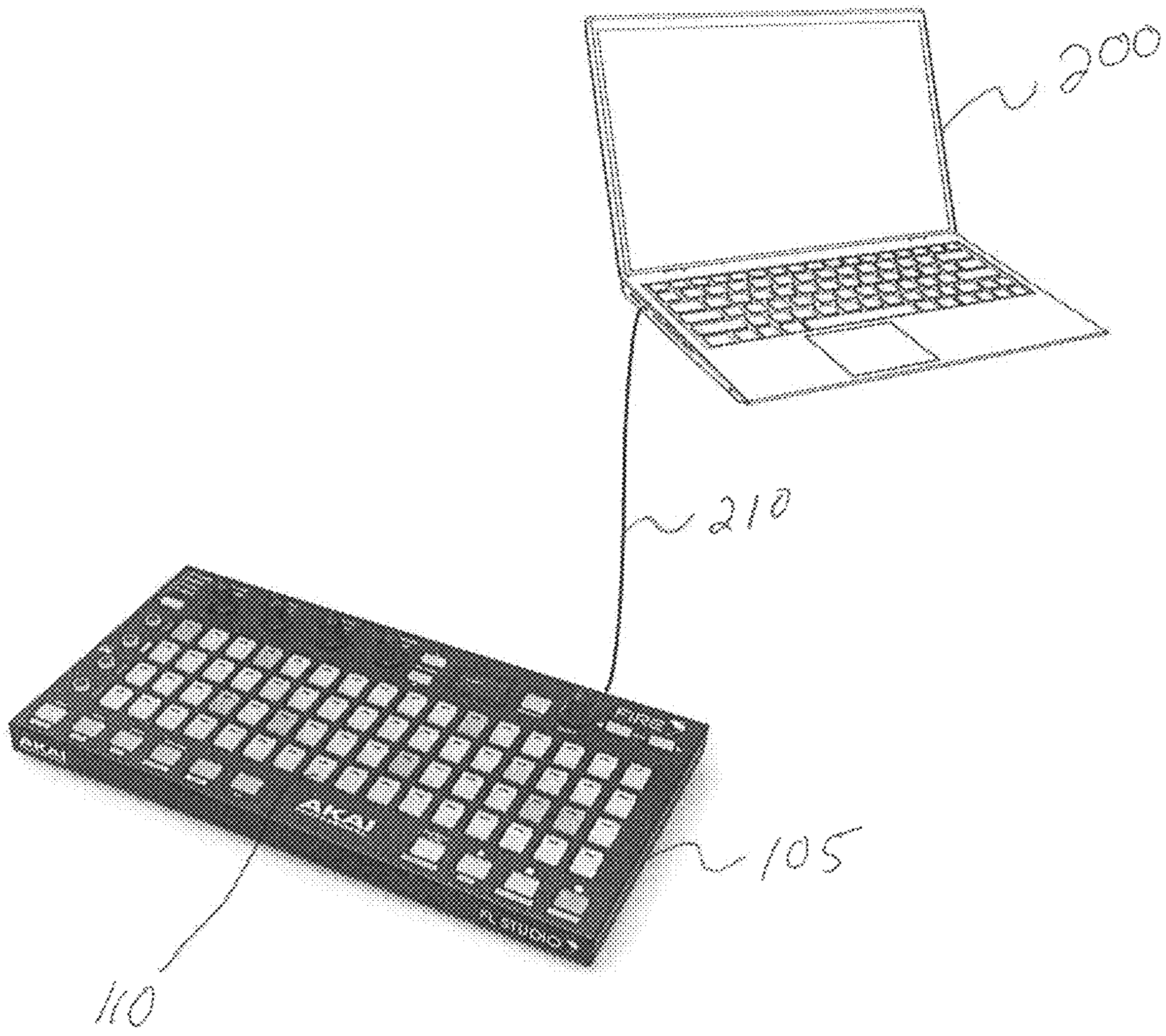
FIG. 2 shows the step sequencer connected to a computer used to control music production software running on the computer.

FIG. 2 illustrates an embodiment where sequencer 105 is connected to computer 200 and acts as a controller for music production software operating on computer 200. The sequencer 105 is connected to computer 200 via a USB connection 210. Alternatively, the connection may be a wireless connection. In one preferred embodiment, the music production software is FL Studio. In the embodiment in FIG. 2, sequencer emulates or mimics a portion of the graphical user interface of the music production software. This enhances the user experience when using the sequencer to control the software.

Figure 3:
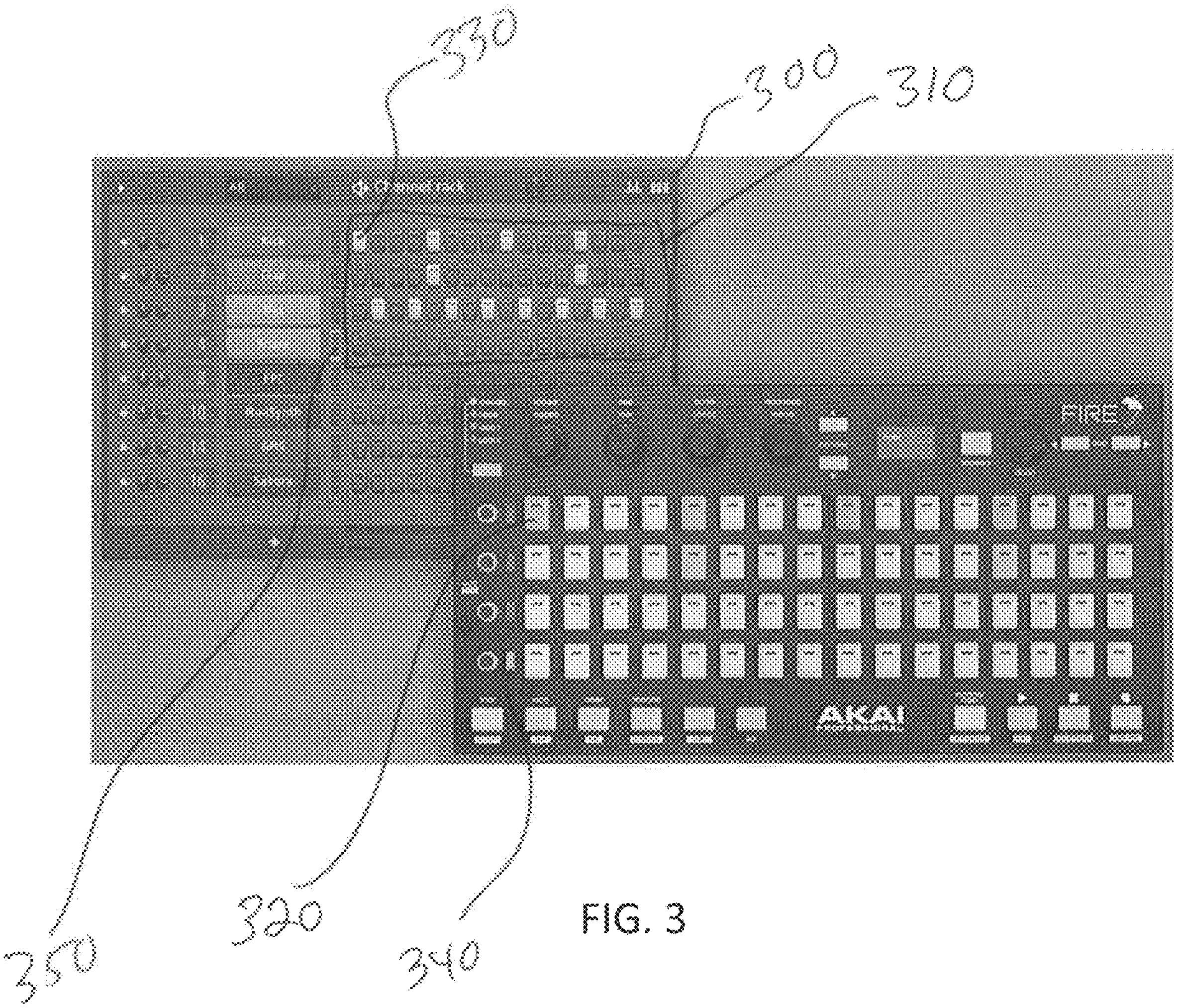
FIG. 3 shows the step sequencer and a graphical user interface of the music production software controlled by the step sequencer.

For example, as shown in FIG. 3, button grid 110 may be used to select and deselect virtual buttons in a virtual button grid 300 displayed on computer 200 by a software-implemented sequencer application running on a general-purpose computer. In this embodiment, the software is operating as a step sequencer with a channel rack that includes a number of instrument sounds, e.g., kick, clap, hat, snare, etc. In this embodiment, the 4×16 grid 110 of the sequencer corresponds to the virtual 4×16 grid 310 displayed on the computer. When a user selects a button 320 to program a sequence, the corresponding virtual button 330 on the virtual grid 310 is selected, which simultaneously cases changes the color of the physical and virtual buttons 320 and 330 to show the user the step in the sequence has been selected. The sequencer sends control signals to the music production software, which can be in the form of MIDI on/off signals to instruct the software of the sequence programmed by the user. Both the sequencer and the graphical user interface include an indicator 340, 350 to indicate the channel that is selected.

As shown in FIG. 3, the graphical user interface includes more tracks and virtual buttons than just a 4×16 grid. The knob 9 (FIG. 1) may be used to select different 4×16 tracks and steps on the virtual grid 300 (which may included 32 or more steps in a sequence).

Figure 4:
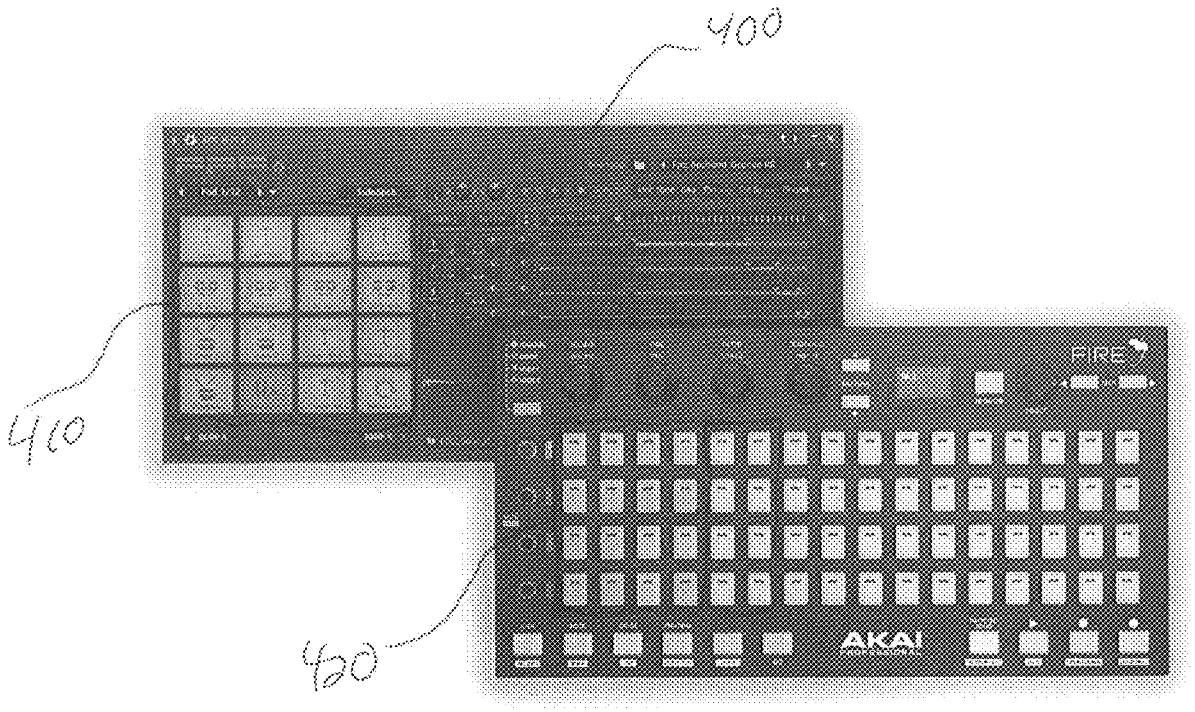
FIG. 4 shows the step sequencer and a second graphical user interface of the music production software controlled by the step sequencer.

FIG. 4 shows another type of graphic user interface 400 controlled by sequencer 105. This embodiment corresponds to a drum mode, which can be activated by pressing button 15 (FIG. 1). In this embodiment, a 4×4 grid 410 of the sequencer corresponds to a 4×4 MPC grid 420 displayed on computer 200. The colors of the virtual drum pads can correspond to the colors of the grid 410, with different colors used to indicate different sounds, e.g., tom, snare, hi-hat, kick drum, etc. Like the previous embodiment, pressing one of the buttons on the sequencer causes the corresponding virual drum pad to light up.

While the examples of FIGS. 3 and 4 show two examples of how the sequencer can be used to control the music production software, it is apparent that other aspects of music production software can be controlled, such as various mixing and editing functions used in FL Studio.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Computer programs, program modules, and code based on the written description of this specification, such as those used by the microcontrollers, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

Another aspect of the disclosure is directed to a non-transitory computer-readable medium storing instructions which, when executed, cause one or more processors to perform the methods of the disclosure. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A musical step sequencer, comprising:

a button grid comprising a plurality of rows and a plurality of columns of grid buttons, wherein each of the columns represents a temporal portion of a sound pattern, and one or more patterns are generated by pressing buttons on the grid; and an output, wherein signals corresponding to the one or more patterns are generated at the output, wherein the signals are control signals for controlling a graphical user interface generated by a music production software, the graphical user interface including a virtual representation of the button grid, wherein at least one button within the button grid and at least one corresponding button on the virtual representation of button grid both simultaneously change color when the at least one button is activated, and wherein the color of the activated at least one button and the at least one corresponding button is based on a column that the at least one button is in and frequency content of a sound outputted by the musical step sequencer.

2. The step sequencer of claim 1, wherein the output is a USB port.

3. The step sequencer of claim 1, wherein the signals are MIDI on or off signals.

4. The musical step sequencer of claim 1, wherein the color indicates a presence of high-frequency content when the at least one button is in a column on a right side of the musical step sequencer and indicates a presence of low-frequency content when the at least one button is in a column on a left side of the musical step sequencer.

5. The musical step sequencer of claim 4, wherein colors of the button grid mimic a spectral image of the sound.

6. A system comprising:

a computer;

a step sequencer;

music production software running on said computer, said music production software including instructions for generating a graphical user interface that includes a virtual representation of a grid of buttons corresponding to the step sequencer wherein each column in the grid represents a temporal portion of a sound pattern; and the step sequencer coupled to the computer and used to control the music production software, the step sequencer having a grid of buttons corresponding to the virtual grid of buttons on said graphical user interface, wherein pressing a button on said step sequencer causes the corresponding button on said graphical user interface to be activated, wherein at least one button within the grid of buttons and at least one corresponding button on the virtual representation both simultaneously change color when the at least one button is activated, and wherein the color of the activated at least one button and the at least one corresponding button is based on a column that the at least one button is in and frequency content of a sound outputted by the musical step sequencer.

7. The system of claim 6, wherein the both the grid of buttons and the virtual representation are 4 rows by 16 columns.

8. The system of claim 7, wherein each row corresponds to a channel and each column corresponds to a step in a sequence.

9. The system of claim 7, wherein a sequence programmed on said step sequencer is simultaneously programmed by said music production software.

10. The system of claim 9, wherein playing a sequence on the step sequencer cause a same sequence to play on the graphical user interface.

11. The system of claim 10, wherein playing a sequence on the step sequencer causes the corresponding buttons to activate on the grid of buttons on said graphical user interface.

12. The system of claim 6, wherein the grid buttons on the controller are soft touch RGB.

* * * * *